United States Patent
Dalton

[15] 3,682,497
[45] Aug. 8, 1972

[54] RADIAL FOLD-UP LANDING GEAR

[72] Inventor: Thomas B. Dalton, Muskegon, Mich.

[73] Assignee: Westran Corporation, Muskegon, Mich.

[22] Filed: Sept. 4, 1970

[21] Appl. No.: 69,722

[52] U.S. Cl..............................280/150.5, 254/86 H
[51] Int. Cl.................................................B60s 9/02
[58] Field of Search............280/150.5; 254/86, 86 H; 296/57 A; 248/188.6, 292

[56] References Cited

UNITED STATES PATENTS

| | | | |
|---|---|---|---|
| 3,489,428 | 1/1970 | Hunter et al. | 280/150.5 |
| 3,033,523 X | 5/1962 | Mulholland et al. | 280/150.5 |
| 2,734,726 | 2/1956 | Gebhart | 254/86 R |
| 1,963,388 | 6/1934 | Smith | 296/57 A UX |
| 3,104,891 | 9/1963 | Dalton | 280/150.5 |
| 2,499,625 | 3/1950 | Black | 280/150.5 X |
| 3,236,501 | 2/1966 | McKay | 254/86 R |
| 3,425,714 | 2/1969 | Morris | 254/86 R X |
| 2,595,453 | 5/1952 | Gilmore | 280/150.5 |
| 3,172,632 | 3/1965 | Borg | 248/292 X |
| 2,184,814 | 12/1939 | Nagamatsu | 296/57 A UX |

Primary Examiner—Benjamin Hersh
Assistant Examiner—Robert R. Song
Attorney—Hauke, Gifford and Patalidis

[57] ABSTRACT

A landing gear support for a trailer or the like including a pair of legs secured to opposite sides of the forward portion of the trailer and movable between an extended, ground engaging position and a retracted position. Each of the legs includes a gear mechanism with a rotatably mounted shaft extending therebetween such that with a single manual crank both legs may be moved between the extended position and the retracted position. Each of the legs may then be folded upwardly to a substantially horizontal position beneath the trailer body, providing greater ground clearance. To provide the upward movement, the upper ends of each of the legs are secured to swivel members which are pivotally mounted upon base members that are secured to the trailer body, such that the legs may be pivoted about a transversely extended axis to their folded-up position. Each of the swivel members has a spring-loaded pin mounted thereon for insertion into a first hole formed in its associated base member for securing the leg in a vertical unfolded position, and a second hole formed in the base member for securing the leg in its folded-up position.

6 Claims, 5 Drawing Figures

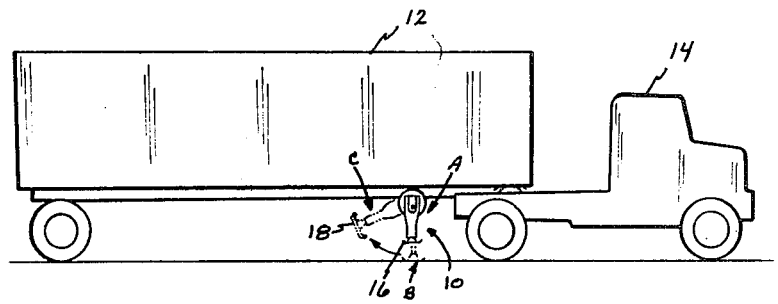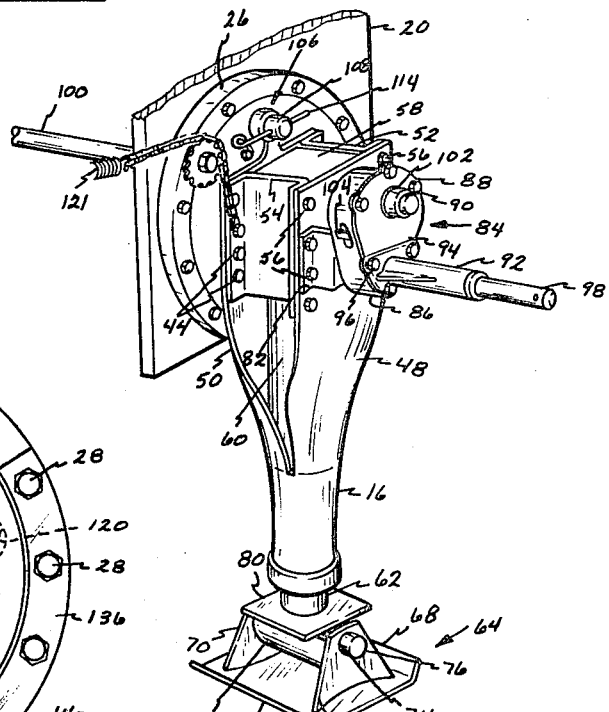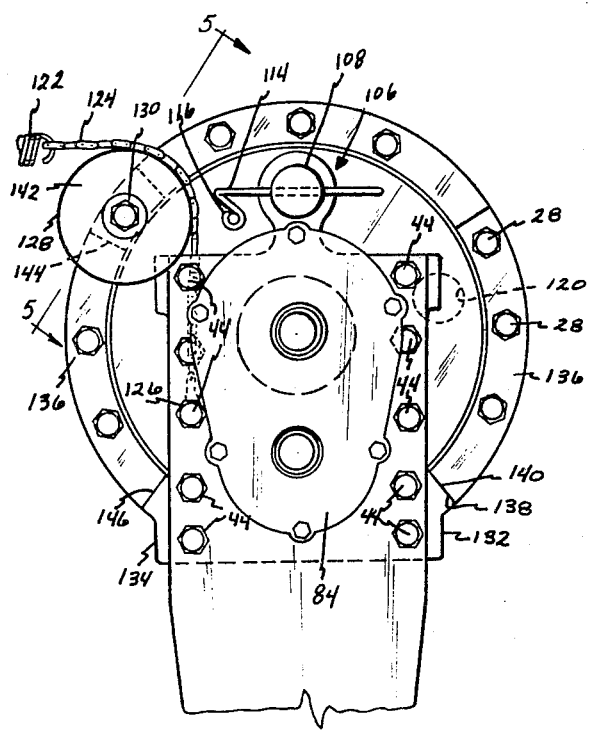

RADIAL FOLD-UP LANDING GEAR

BACKGROUND OF THE INVENTION

1. Field of the Invention

The invention relates broadly to landing gear for trailers or similar vehicles and more particularly to a landing gear which may be folded-up into a substantially horizontal position beneath the trailer body.

2. Description of the Prior Art

Heretofore, retractable landing gears have included linkage whereby the supporting legs or struts, provided at their ends with small wheels, casters or the like, have been movable from an extended position wherein the wheels contact the ground to a retracted position. Usually the shift of these legs or struts from one position to the other is brought about by the manual actuation of a crank. Many of these telescoping-type legs are provided with the necessary gearing such that they may be radially swung upwardly beneath the trailer body but have included braces having one end pivotally mounted to the leg and the other end slidably mounted on a track secured to the under surface of the trailer body, adding to the weight, expense and general complexity of the apparatus.

SUMMARY OF THE PRESENT INVENTION

The retracting and swinging type of radial fold-up landing gear of the present invention provides a leg structure which is relatively simple, lightweight, inexpensive, compact, and which may be manually swung between its downward and upward position with relative ease and without the braces normally used in this type of landing gear.

The landing gear legs of the present invention may be moved not only between an extended, ground engaging, load bearing position to a retracted position, but may also be radially folded-up under the semi-trailer body to a substantially horizontal position. The landing gear includes a pair of disc-shaped base members each secured to the forward portion of the trailer adjacent opposite sides thereof. Each of the base members has a keeper ring bolted on the outer surface thereof which forms a radially extending annular groove between the keeper member and its respective base member. Each of the base members has a disc-shaped swivel member having an outwardly extending annular flange rotatably mounted thereon, with the flange slidably mounted within the annular groove such that each of the swivel members rotates about an axis transverse to the axis of elongation of the trailer. The upper ends of each of the landing gear legs is fixedly secured to the outer surface of one of the swivel members such that as the swivel member pivots within the annular groove the landing gear leg is pivoted between its unfolded position and its radially folded-up position beneath the trailer body.

Each of the several members includes a spring-loaded pin slidably mounted thereon to be selectively received in a first hole formed in the base member for securing the leg in its vertical unfolded position, and a second hole formed in the base member for securing the leg in its folded-up position. One of the legs has a gear box secured to the outer surface of its upper portion and a shaft extending therefrom to be engaged by a manual crank. The gear box includes a second shaft extending therefrom to both of the legs, such that as the crank is turned both legs are simultaneously moved between the retracted position and the extended position.

DESCRIPTION OF THE DRAWINGS

The description refers to the accompanying drawings in which like reference characters refer to like parts throughout the several views, and in which:

FIG. 1 is a side elevational view of a conventional tractor and trailer utilizing the landing gear of the present invention;

FIG. 2 is a perspective view of one side of the landing gear of the present invention in its unfolded retracted position;

FIG. 3 is a side elevational view of the upper portion of one side of the landing gear of the present invention;

DESCRIPTION OF THE PREFERRED EMBODIMENT

Referring to FIG. 1, the landing gear of the present invention, generally indicated at 10, is shown connected to the forward portion of a trailer 12 immediately to the rear of the portion of the trailer 12 which is pivotally connected to the rear end of a tractor 14. The landing gear 10 is shown in solid lines in the unfolded retracted position (as shown at A), and in phantom lines in the unfolded extended position (as shown at B) and the folded-up retracted position (as shown at C). In the unfolded retracted position, the tractor 14 may pull the trailer 12 to its destination. Alternatively, before the trailer 12 is pulled to its destination, the landing gear legs 16 may be moved to the folded-up retracted position, as indicated at C. Upon reaching the destination, the landing gear legs 16 are swung to their unfolded retracted position A and then cranked down to their extended position C, such that the trailer 12 may be detached from the tractor 14 with the forward portion of the trailer 12 resting upon the landing gear 10.

Figure 4:
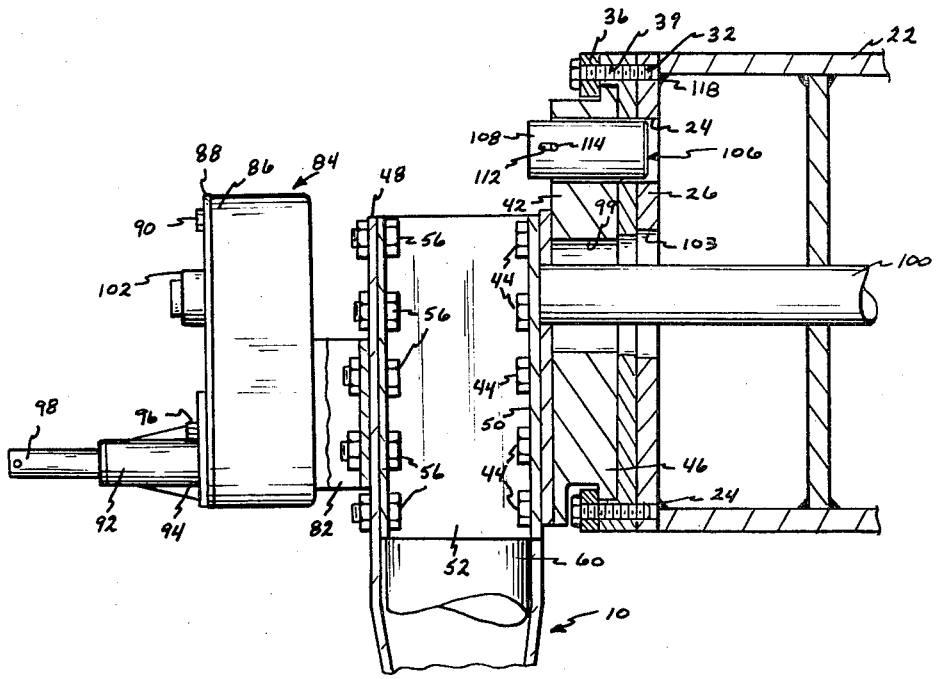
FIG. 4 is a partial cross-sectional side view of the landing gear of the present invention.

Referring to FIGS. 2, 3, and 4, each of the legs 16 is secured to a vertically disposed flat rectangular plate 20 secured to the trailer frame 22 adjacent opposite sides of the forward portion of the trailer 12 as by welding, bonding or the like as at 24 (FIG. 4). The legs 16 are each pivotally mounted upon circular base plates 26 on the side opposite from the plate 20. The base plates 26 are provided with outer flanges 34 and a keeper ring 36 having an outer diameter substantially the same as the diameter of the plate 26 and an inner diameter less than the diameter of the inner surface 37 of the flange 34 is secured to the outer edge of the flange 34 by means of bolts 38 extending through apertures 39 formed through the keeper ring 36, the flange 34 and the base plate 26. The ring 36 extends inwardly past the inner edge of the flange 34 forming an inwardly opening circular groove 40 between the keeper ring 36, the flange 34 and the flat portion of the plate 26, all as can best be seen in FIG. 4.

The leg 16 is secured to the outer surface of a disc-shaped swivel member 42 by means of bolts 44. The member 42 includes a radially extending flange 46 disposed adjacent one face thereof which extends into the groove 40 such that the disc member 32 is rotatably mounted thereon. Thus, the disc member 42 may rotate with respect to the plate 26 and the frame 22 of the trailer about an axis transverse to the axis of elongation of the trailer.

As can best be seen in FIG. 2, each of the legs 16 includes a pair of plates 48 and 50 which are disposed on opposite sides of the leg 16 and are generally flat at their upper ends and taper inwardly to form the outer protective covering of the leg 16. The upper portion of the plate 50 is secured to the member 42 by the bolts 44 extending through apertures formed adjacent the side edges thereof. The upper portion of the plates 48 and 50 are held together by a pair of outwardly facing U-shaped members 52 and 54 extending between the two plates with one flange of each member being secured to the plate 50 adjacent opposite side edges by means of the bolts 44, and the other flange of each member being secured to the plate 48 adjacent opposite side edges by means of bolts 56.

Thus, an opening 58 is formed between the upper portions of the plates 48 and 50 and the members 52 and 54 for receiving a cylindrical outer housing 60 which forms a portion of the leg 16 and has the leg gearing mechanism disposed therein. A second tubular housing 62 has its upper portion slidably mounted within the lower portion of the housing 60 for forming the lower part of the leg 16. A landing gear foot, generally indicated at 64, is secured to the lower end of the housing 62 for engaging the ground to support the forward portion of the trailer. The landing gear foot 64 includes a generally flat rectangular ground engaging member 66 having a pair of upwardly extending flanges 68 formed at each end thereof. A pair of spaced apart upwardly extending tabs 70 and 72 are secured to the upper surface of the member 66 as by welding, bonding or the like and are formed with apertures 74 therein. A shaft 76 is mounted in the pair of apertures 74 between the pair of tabs 70 and 72 and has a tubular sleeve 78 pivotally mounted therearound. A rectangular plate 80 is secured to the lower end of the tubular housing 62 as by welding, bonding or the like and has its lower surface secured to the tubular sleeve 78 as by welding, bonding or the like such that the landing gear foot 64 is pivotally mounted on the lower end of the tubular housing 62. The tubular housing 62 is slidably mounted within the housing 60 between a retracted position within the housing 60 and an extended position wherein the landing gear foot 64 engages the ground to support the forward portion of the trailer.

A U-shaped member 82 has its two outwardly extending flanges secured to the outer surface of the plate 48 by means of the bolts 56 for supporting a gear box 84. The gear box 84 includes a housing 86 with a cover plate 88 secured thereto by means of bolts 90. A tubular housing 92 having a bracket 94 formed at one end is secured to the outer surface of the plate 88 by means of bolts 96 and has a shaft 98 rotatably mounted therein. The shaft 98 extends into the housing 86 and has a gear (not shown) secured on its inner end. A manual crank may engage the outer end of the shaft 98 for rotating the same.

A second shaft 100 extends through the gear box 84 and has one end rotatably mounted in a journal bearing 102 disposed within the plate 88. The gear box 84, which is a two-speed gear box, includes a lever 104 extending outwardly from the housing 86 for changing between a high and a low gear. Thus, as the shaft 98 is rotated by the manual crank, the rotation thereof is transferred through the gears contained in the gear box 84 to rotate the shaft 100.

The shaft 100 extends through the plate 48 and the housing 60 and through a bevel gear arrangement, which is well known in the art, disposed within the housing 60 which raises and lowers the housing 62 as the shaft 100 is rotated. The shaft 100 extends through the plate 50 and apertures 99, 101 and 103 formed in the member 42, plate 26 and 20, respectively, to the other leg 16. It will be noted that the shaft 100 extends along the axis of rotation of the member 42, such that the member 42 may be rotated between the unfolded and folded-up positions without affecting the position of the shaft.

A spring-loaded pin mechanism 106 is provided for securing the landing gear in its unfolded and folded-up positions. The mechanism 106 includes a cylindrical pin 108 slidably mounted within a cylindrical aperture 110 formed in the member 42. The pin includes a transversely extending aperture 112 formed in its outer end for receiving one end of a spring 114, which urges the pin 108 into the aperture 110. The spring 114 has its other end secured around a bolt 116 secured to the member 42. In the unfolded position, the pin 108, spring-loaded by the spring 114 so as to push it into the aperture 110, projects into an aperture 118 formed adjacent the top of the plates 26 and 20, so as to secure the leg 16 in its vertical position. In order to swing the leg 16 to its folded-up position, the outer end of the spring 114 is grasped and the pin 110 pulled outwardly so as to be pulled out of the aperture 118, allowing the leg 16 to rotate clockwise as viewed in FIG. 3, with the flange 46 pivoting within the groove 40. In its folded-up position, the pin 108 extends into an aperture 120 formed in the plates 26 and 20, securing the leg in its folded-up position.

Thus, the spring mechanism 106 secures the leg 16 in its unfolded and folded-up positions. A spring 122 (FIGS. 2 and 3) is provided for aiding in swinging the landing gear leg 16 to its folded-up position. The spring 122 has one end secured to the frame 22 of the trailer at any convenient location and the other end secured to one end of a chain 124. The other end of the chain 124 is secured to a bolt 126 which is secured onto one of the flanges of the member 54. The chain 124 extends around a sprocket 128 which is pivotally mounted on a bolt 130 secured to the ring 36. Thus, when the pin 108 is moved out of the aperture 118, the spring 122, through the chain 124, creates a moment on the member 42 about the axis of rotation of the member, aiding in rotating the leg 16 to its folded-up position.

As can be seen in FIG. 3, the member 42 is formed with a pair of outwardly extending stop members 132 and 134 adjacent its lower edge on opposite sides of the plate 50. An arcuate member 136 is secured on top of the ring 36 by means of bolts 28 to provide a surface 138 to be engaged by the surface 140 of the member 132. Thus, as the leg 16 is pushed from its folded-up position to its unfolded position, the surface 140 is contacted by the surface 138, stopping the leg 16 in its vertical position, allowing the pin 108 to snap into the apertures 118 to secure the leg in its unfolded position.

Figure 5:
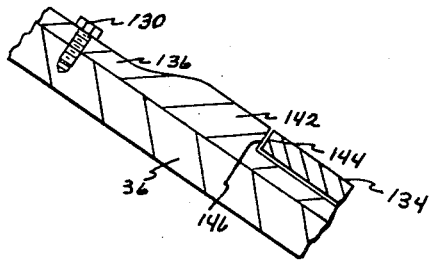
FIG. 5 is a cross-sectional view taken substantially along line 5—5 of FIG. 3.

As can best be seen in FIG. 5, a tab 142 is formed on the outer surface of the member 136 to provide a surface 144 to be engaged by the surface 146 of the member 134. As the leg 16 is swung from its unfolded position to its folded-up position, the surface 146 contacts the surface 144, stopping the leg 16 in its folded-up position, allowing the pin 108 to snap into the apertures 120, securing the leg in its folded-up position.

In operation, a manual crank may be used to rotate the shaft 98, which through the two-speed gear box 84, rotates the shaft 100. The shaft 100 extends from the gear box 84 between the two legs 16 along the axis of rotation of the members 42. As the shaft 100 is rotated, the two legs 16 are simultaneously moved between their extended and retracted positions. When it is desired to swing the legs 16 from their unfolded to their folded-up position, the pin 108 on each of the legs is pulled out of the apertures 118 and each of the legs swung upward with the aid of their respective springs 122. It will be noted that since the shaft 100 is disposed along the axis of rotation of the two members 42, the legs may be separately swung to their folded-up position.

Finally, it will be noted that the portion of the leg assembly disposed between the plates 48 and 50 is symmetrical about a vertical axis, and, therefore, identical structures may be used for both of the landing gear legs 16, reducing the cost of the landing gear 10.

Although I have described but one preferred embodiment of my invention, it is understood that various changes and revisions can be made without departing from the spirit of the invention or the scope of the appended claims.

I claim:

1. A landing gear structure for trailers or the like, comprising:
   a pair of vertically disposed base members each secured to the front portion of said trailer adjacent opposite sides thereof, each of -aid base members having a radially outwardly extending circular groove and a circular, outwardly facing bearing surface;
   a disc-shaped swivel member pivotally mounted on each of said base members, each of said swivel members having a radially extending annular flange formed therearound that is received in said circular groove of its associated base member and a bearing surface slidingly engaging said base member bearing surface, said swivel members being pivotal about a common axis that is substantially perpendicular to the axis of elongation of said trailer;
   a landing gear leg secured to the outer surface of each of said swivel members for movement between an unfolded position and a folded-up position, each of said legs including an upper housing and having a ground engaging member slidably mounted therein with a landing gear foot secured to its lower end, said ground engaging member being movable between an extended and retracted position;
   a latch mechanism secured to each of said swivel members, each latch mechanism including a pin slidably mounted in an aperture formed in said swivel member and means for biasing said pin into said aperture, first and second spaced apertures formed in said base member for receiving the inner end of said pin for respectively securing said leg in its unfolded and folded-up positions; and
   means for biasing each of said legs toward its folded-up position.

2. A landing gear structure as defined in claim 1, and including means for biasing each of said legs to their folded-up position.

3. A landing gear structure as defined in claim 2, wherein each of said biasing means includes a spring having one end secured to said trailer, a chain having one end secured to the free end of said spring and the other secured to said swivel member for biasing said swivel member toward the folded-up position.

4. A landing gear structure as defined in claim 1, wherein each of said landing gear legs is movable between an extended and a retracted position; and including a gear box secured to one of said legs, said gear box including a first shaft extending outwardly therefrom for engagement by a manual crank and a second shaft extending therefrom to the upper portion of both of said legs along the axis of rotation of said swivel members, said second shaft being rotated by the rotation of said first shaft and operative to move said legs between their retracted and extended positions upon rotation thereof.

5. A landing gear structure for trailers or the like, comprising:
   a pair of vertically disposed base members each secured to the front portion of said trailer adjacent opposite sides thereof, each of said base members having a radially outwardly extending circular groove and a circular, outwardly facing bearing surface;
   a disc-shaped swivel member pivotally mounted on each of said base members, each of said swivel members having a radially extending annular flange formed therearound that is received in said circular groove of its associated base member and a bearing surface slidingly engaging said base member bearing surface, said swivel members being pivotal about a common axis that is substantially perpendicular to the axis of elongation of said trailer;
   a landing gear leg secured to the outer surface of each of said swivel members for movement between an unfolded position and a folded-up position, each of said legs including an upper housing and having a ground engaging member slidably mounted therein with a landing gear foot secured to its lower end, said ground engaging member being movable between an extended and retracted position;
   a latch mechanism secured to each of said swivel members, each latch mechanism including a pin slidably mounted in an aperture formed in said swivel member and means for biasing said pin into said aperture, first and second spaced apertures formed in said base member for receiving the inner end of said pin for respectively securing said leg in its unfolded and folded-up positions;
   means for biasing each of said legs toward its folded-up position; and means for simultaneously moving said legs between their retracted and extended positions, said means including a rotatably mounted shaft extending between said legs along the axis of rotation of said swivel members.

6. A landing gear structure as defined in claim 5, wherein each of said landing gear legs is symmetrical about a vertical axis.

* * * * *

UNITED STATES PATENT OFFICE
CERTIFICATE OF CORRECTION

Patent No. 3,682,497　　　　　　　Dated August 8, 1972

Inventor(s) Thomas B. Dalton

It is certified that error appears in the above-identified patent and that said Letters Patent are hereby corrected as shown below:

On the cover sheet under the "ABSTRACT", "6 Claims" should read -- 5 Claims -- .  Column 1, line 57, "several" should read -- swivel -- .  Column 2, line 49, after "base" insert -- members or -- ; line 67, "32" should read -- 42 -- . Column 3, line 1, after "Thus,", insert -- engaging bearing surfaces are provided on the disc member 42 and the plate 26 and -- .  Column 4, line 18, "pin" should read -- latch -- . Column 5, line 40, "-aid" should read -- said -- .  Column 6, cancel the matter beginning with line 7 to and including line 9; line 10, "3." should read -- 2. -- ; and "2" should read -- 1 -- ; line 17, "4." should read -- 3. -- ; line 30, "5." should read --4. -- ; and Column 7, line 6, "6." should read -- 5. -- and "5" should read -- 4. -- .

Signed and sealed this 8th day of May 1973.

(SEAL)
Attest:

EDWARD M.FLETCHER,JR.　　　　　　ROBERT GOTTSCHALK
Attesting Officer　　　　　　　　Commissioner of Patents